United States Patent
Takemoto et al.

(10) Patent No.: US 9,899,952 B2
(45) Date of Patent: Feb. 20, 2018

(54) ELECTRIC POWER STEERING CONTROL DEVICE

(75) Inventors: Yasushi Takemoto, Kobe (JP); Kazushi Kimura, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/980,407

(22) PCT Filed: Apr. 21, 2011

(86) PCT No.: PCT/JP2011/059830
§ 371 (c)(1),
(2), (4) Date: Jul. 18, 2013

(87) PCT Pub. No.: WO2012/144047
PCT Pub. Date: Oct. 26, 2012

(65) Prior Publication Data
US 2013/0285587 A1    Oct. 31, 2013

(51) Int. Cl.
*H02P 29/60*    (2016.01)
*H02P 29/68*    (2016.01)
(Continued)

(52) U.S. Cl.
CPC ........ *H02P 29/0044* (2013.01); *B62D 5/0496* (2013.01); *H02P 29/60* (2016.02); *H02P 29/68* (2016.02)

(58) Field of Classification Search
CPC .......................... G03G 15/2039; G03G 15/205
(Continued)

(56) References Cited

U.S. PATENT DOCUMENTS 3,921,220 A * 11/1975 Primosch ............. G11B 15/005
242/333.7
5,448,224 A *  9/1995 Mochizuki ........... G08B 29/043
340/508
(Continued)

FOREIGN PATENT DOCUMENTS

JP    2001-130432 A    5/2001
JP    2002-240733 A    8/2002
(Continued)

OTHER PUBLICATIONS

International Search Report of PCT/JP2011/059830 dated Aug. 9, 2011.
(Continued)

*Primary Examiner* — Eduardo Colon Santana
*Assistant Examiner* — Devon Joseph
(74) *Attorney, Agent, or Firm* — Sughrue Mion, PLLC; Richard C. Turner (57) ABSTRACT

A electric power steering control device equipped with a motor having a resolver detection unit includes: an ambient temperature detector for detecting ambient temperature around a portion generating heat by current flow; a motor temperature detector for, based on a signal from the resolver detection unit of the motor, estimating the temperature of the portion generating heat; and an abnormality determiner for comparing the temperature detected by the ambient temperature detector with the temperature detected by the motor temperature detector and determining that the ambient temperature detector is abnormal.

9 Claims, 6 Drawing Sheets

(51) Int. Cl.
*H02P 29/00* (2016.01)
*B62D 5/04* (2006.01)

(58) Field of Classification Search
USPC .......................................... 318/280, 400.02
See application file for complete search history.

(56) References Cited

U.S. PATENT DOCUMENTS

| | | | | |
|---|---|---|---|---|
| 7,839,108 B2* | 11/2010 | Patel | ................... | H02H 7/0852 |
| | | | | 318/400.01 |
| 2001/0015631 A1* | 8/2001 | Shimane et al. | ............... | 318/280 |
| 2005/0205344 A1* | 9/2005 | Uryu | .............. | 180/446 |
| 2005/0242760 A1* | 11/2005 | Fujita | ..................... | H02P 23/14 |
| | | | | 318/434 |
| 2006/0247888 A1* | 11/2006 | Kojima | .............. | B23Q 11/0007 |
| | | | | 702/130 |
| 2007/0126837 A1* | 6/2007 | Takahashi | .............. | B41J 11/007 |
| | | | | 347/104 |
| 2007/0201171 A1* | 8/2007 | Kanekawa | .......... | H03M 1/1004 |
| | | | | 361/42 |
| 2007/0290633 A1* | 12/2007 | Atarashi | ............... | B60L 3/0023 |
| | | | | 318/66 |
| 2008/0040001 A1* | 2/2008 | Ogawa | ................... | B62D 5/008 |
| | | | | 701/41 |
| 2008/0048591 A1* | 2/2008 | Hamada | ............... | B62D 5/0496 |
| | | | | 318/9 |
| 2008/0055799 A1* | 3/2008 | Serizawa et al. | ................ | 361/24 |
| 2008/0144693 A1* | 6/2008 | Sato | ....................... | G01K 15/00 |
| | | | | 374/1 |
| 2008/0230302 A1* | 9/2008 | Tamaki | ................ | B62D 5/0463 |
| | | | | 180/443 |
| 2009/0240389 A1* | 9/2009 | Nomura | ................. | B62D 5/046 |
| | | | | 701/31.4 |
| 2010/0030427 A1* | 2/2010 | Mitsuhara | .......... | B62D 15/0215 |
| | | | | 701/41 |
| 2010/0045227 A1* | 2/2010 | Ura | .................... | G01D 5/24461 |
| | | | | 318/490 |
| 2011/0043144 A1* | 2/2011 | Ueda et al. | .............. | 318/400.02 |
| 2011/0101904 A1* | 5/2011 | Sakamoto | ............ | B62D 5/0481 |
| | | | | 318/473 |
| 2012/0203408 A1* | 8/2012 | Migita | ........................... | 701/22 |

FOREIGN PATENT DOCUMENTS

| | | |
|---|---|---|
| JP | 2003-315162 A | 11/2003 |
| JP | 2004-082757 A | 3/2004 |
| JP | 2004-090676 A | 3/2004 |
| JP | 2004-268671 A | 9/2004 |
| JP | 2006-044437 A | 2/2006 |
| JP | 2006-214969 A | 8/2006 |
| JP | 2010-030469 A | 2/2010 |

OTHER PUBLICATIONS

Communication dated Mar. 31, 2015 from the Chinese Intellectual Property Office in counterpart application No. 201180069676.0.
Communication dated Nov. 5, 2015 issued by the State Intellectual Property Office of the People's Republic of China in counterpart application No. 201180069676.0, 7 pages.
Communication dated Jun. 10, 2015 from the European Patent Office in counterpart European Application No. 11863837.8.

* cited by examiner

ELECTRIC POWER STEERING CONTROL DEVICE

CROSS REFERENCE TO RELATED APPLICATIONS

This is a National Stage of International Application No. PCT/JP2011/059830 filed Apr. 21, 2011, the content of all of which is incorporated herein by reference in its entirety.

TECHNICAL FIELD

The present invention relates to a vehicle electric power steering control device equipped with an electric motor that provides an assist force for a turning operation on a steering wheel, and more particularly, to an electric power steering control device including ambient temperature detecting means for detecting ambient temperature around a portion generating heat and abnormality detecting means for detecting an abnormality of the ambient temperature detecting means in order to protect an electric motor and an electric control circuit that generate heat by a current.

BACKGROUND ART

An electric power steering control device in the related art described, for example, in PTL 1, is equipped with an electric motor that generates an assist force for a turning operation on a steering wheel by a current flown correspondingly to an operating condition of the vehicle. This device compares a temperature detected using temperature detecting means, for example, a thermistor, capable of detecting ambient temperature around a portion generating heat by a current flown to the electric motor with an estimated temperature value of the portion generating heat found on the basis of a current value of the current flown to the electric motor, and determines that the temperature detecting means is abnormal according to a variation of the detection temperature of the temperature detecting means.

CITED LIST

Patent Literature

PTL 1: JP-A-2001-130432

SUMMARY OF THE INVENTION

Technical Problem

An actual temperature of the electric motor and actual ambient temperature are, however, affected by the influence of not only the heat generation by the motor current but also air temperature and atmospheric temperature depending on an attachment position of the motor to the vehicle.

Nevertheless, according to the technique in the related art disclosed in PTL 1, the estimated value of the portion generating heat is an estimated temperature value found on the basis of a current of the electric motor alone and atmospheric temperature of the vehicle cannot be taken into consideration because of its nature. Accordingly, the estimated value has an error from the actual temperature and this raises a problem that a false detection is likely to occur unless a relatively large margin is allowed for a determination value on the basis of which a determination is made that the temperature detecting means is abnormal.

Also, in order to estimate a temperature, it is necessary to flow the motor current for a certain time. Hence, there is a problem that it takes a relatively long certain time until an abnormality of the temperature detecting means is detected.

In this case, assume an abnormality, for example, that the temperature detecting means indicates a low temperature even though the motor is already hot when a temperature detection begins with a start-up of the electric power steering system, then there is a problem that the abnormality cannot be detected until the temperature is estimated in spite of the fact that the temperature detecting means is abnormal.

Further, because the motor current is kept flown for a certain time by the method in the related art, the temperature is estimated necessarily in a state where the temperature of the motor has risen. Hence, an abnormality determination is limited to a region on a high-temperature side. Such limitation makes it impossible to detect high-temperature fixation, that is, the temperature detecting means indicates a high temperature even though the temperature is low. That is, there is a problem that a detectable region is limited and an abnormal state itself cannot be detected.

Further, this problem may be solved by additionally providing one more ambient temperature detecting means as described above, for example, a thermistor, for abnormality determination, that is, by using two thermistors. In this case, however, the cost is increased.

The invention was devised to solve the problems discussed above and has an object to obtain an electric power steering control device capable of minimizing a margin allowed to avoid a false determination on an abnormality determination value of ambient temperature detector for a portion generating heat, and equipped with abnormality detecting means capable of making an abnormality determination with a high degree of accuracy.

The invention has another object to obtain an electric power steering control device capable of determining an abnormality of the ambient temperature detector in a short time, which consequently makes a time required for an abnormality determination shorter even when the ambient temperature detector is abnormal, and thereby becoming capable of limiting a current quickly so as to lessen damage on the portion generating heat by a motor current.

The invention has still another object to obtain an electric power steering control device equipped with abnormality determiner having a wide abnormal temperature detection region including a low-temperature region.

Solution to Problem

An electric power steering control device of the invention is a vehicle electric power steering control device equipped with a motor generating an assist force for a truing operation on a steering wheel by a current flown correspondingly to an operating condition of the vehicle and having a resolver detection unit. The electric power steering control device includes: ambient temperature detector for detecting ambient temperature around a portion generating heat by the current; motor temperature detector having temperature characteristics and for estimating a temperature of the portion generating heat on the basis of a signal of the resolver detection unit of the motor; and abnormality determiner for determining that the ambient temperature detector is abnormal by comparing a detection temperature by the ambient temperature detector with a temperature detected by the motor temperature detector.

Advantageous Effects of Invention

According to the electric power steering control device of the invention, it becomes possible to obtain an electric power steering control device capable reducing a margin allowed to avoid a false determination on the abnormality determination value of the ambient temperature detector for the portion generating heat to a minimum, and equipped with the abnormality detecting means capable of making an abnormality determination with a high degree of accuracy.

Also, it becomes possible to obtain an electric power steering control device capable of determining an abnormality of the ambient temperature detector in a short time, which consequently makes a time required for an abnormality determination shorter even when the ambient temperature detector is abnormal, and thereby becoming capable of limiting a current quickly so as to lessen damage on the portion generating heat by a motor current.

In addition, because the motor temperature detector using a signal of the resolver detection unit has temperature characteristics, a temperature can be detected quickly and a detection can be made even in a low-temperature region. Hence, it becomes possible to detect a motor temperature and make an abnormality determination on the ambient temperature detector even in a low-temperature region in which the method in the related art is not feasible.

Further, the temperature is detected on the basis of a signal from the resolver detection unit, which is provided in the related art mainly with the aim of detecting a motor rotation angle. Hence, without the need to additionally provide one more thermistor for an abnormality determination on the ambient temperature detector and hence without a cost increase, it becomes possible to obtain advantages equivalent to those in a case where a thermistor is provided additionally.

The foregoing and other objects features, aspects, and advantages of the present invention will become more apparent from the following detailed description of the present invention when taken conjunction with the accompanying drawings.

DESCRIPTION OF EMBODIMENTS

First Embodiment

Hereinafter, a first embodiment of the invention will be described in detail with reference to the drawings.

Figure 1:
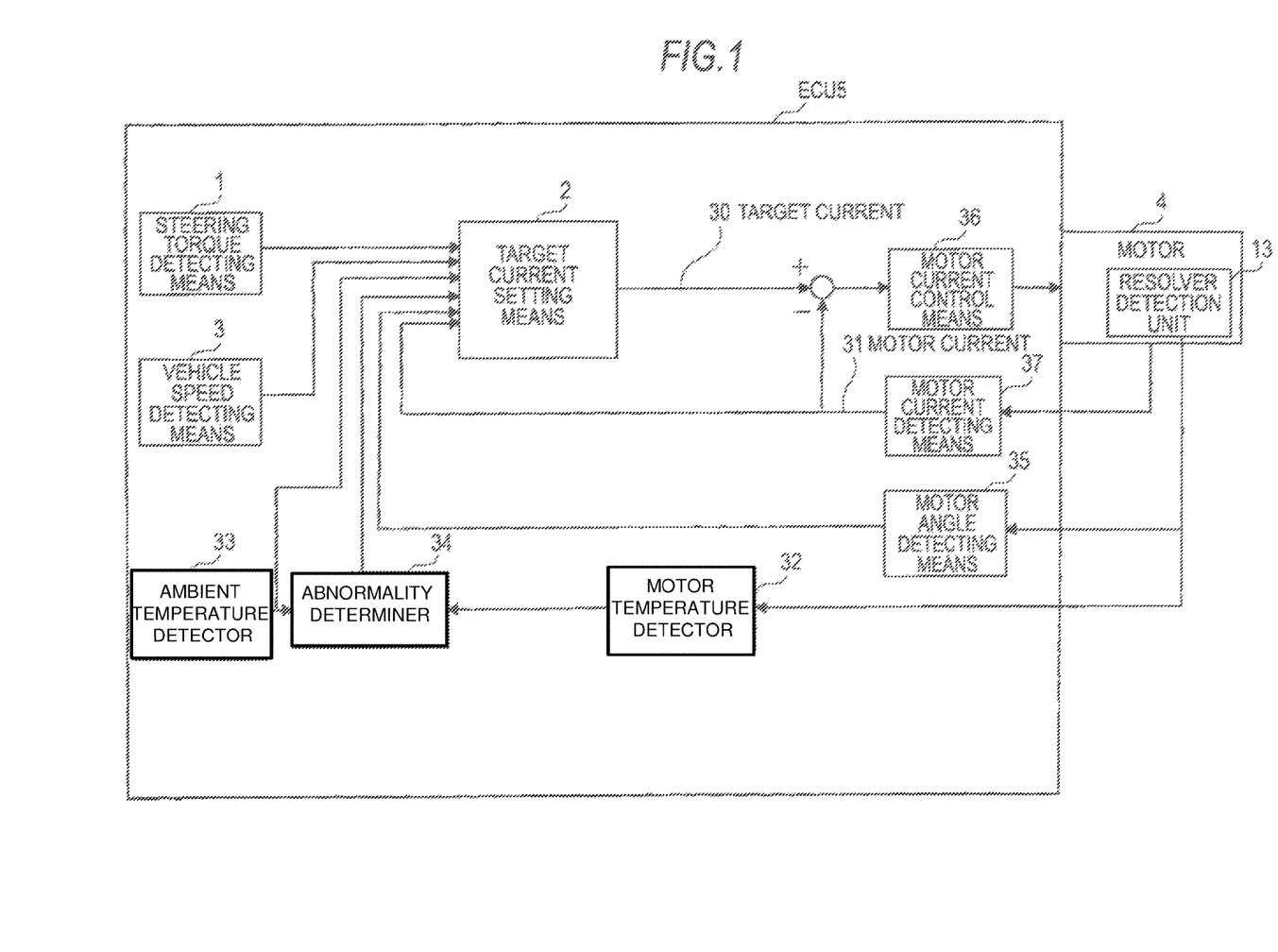
FIG. 1 is a schematic block diagram showing a configuration of an electric power steering control device according to a first embodiment of the invention.

FIG. 1 is a block diagram used to describe a configuration of an electric power steering control device according to the first embodiment of the invention.

Referring to FIG. 1, a motor 4 assisting the driver with a steering force and an electronic control unit (hereinafter, abbreviated to ECU) 5 controlling the motor 4 are combined into one component. The ECU 5 is formed of steering torque detecting means 1 for detecting a steering-wheel steering force by the driver, motor current detecting means 37 for detecting a current 31 of the motor 4, target current setting means 2 for computing a current to be flown to the motor 4 to assist the driver with a steering force, motor current control means 36, motor rotation angle detecting means 35 for detecting a motor rotation angle and motor temperature detector 32 for detecting a motor temperature on the basis of a signal from a resolver detection unit 13, ambient temperature detector 33 for detecting a temperature on a board of the ECU 5 on the basis of a detection value, for example, of a thermistor, and abnormality determiner 34 for making an abnormality determination on the ambient temperature detector 33 on the basis of information obtained from the motor temperature detector 32 and the ambient temperature detector 33 mentioned above.

The target current setting means 2 of the motor computes a target current on the basis of a detection torque from the steering torque detecting means 1 and outputs from the motor rotation angle detecting means 35, vehicle speed detecting means 3, the motor current detecting means 37, and the like. Further, the target current setting means 2 determines a value with which a target current is limited by the ambient temperature detector 33 and the abnormality determiner 34 as a final target current 30. The motor current control means 36 controls a motor current 31 by computing a motor drive signal using proportional-integral control means (PI control) or proportional-plus-integral-plus-derivative control means (PID control) so that a deviation between the target current 30 outputted from the target current setting means 2 and the motor current 31 detected by the motor current detecting means 37 becomes zero.

A radius of a Lissajous circle obtained from a signal outputted from the resolver detection unit 13, which will be described below, is computed by the motor temperature detector 32 and a motor temperature is detected with a high degree of accuracy from the computation result. By comparing the motor temperature with the ambient temperature obtained by the ambient temperature detector 33 using the abnormality determiner 34, it becomes possible to make an abnormality determination on the ambient temperature detector 33 with a high degree of accuracy, which makes it possible to control the motor current 31 most suitably upon abnormality determination.

An example of the control method will be now described in detail.

Firstly, an example of a motor temperature detection method by the motor temperature detector 32 to detect a motor current on the basis of an output signal of the resolver detection unit 13 will be described using FIG. 2 through FIG. 4.

Figure 2:
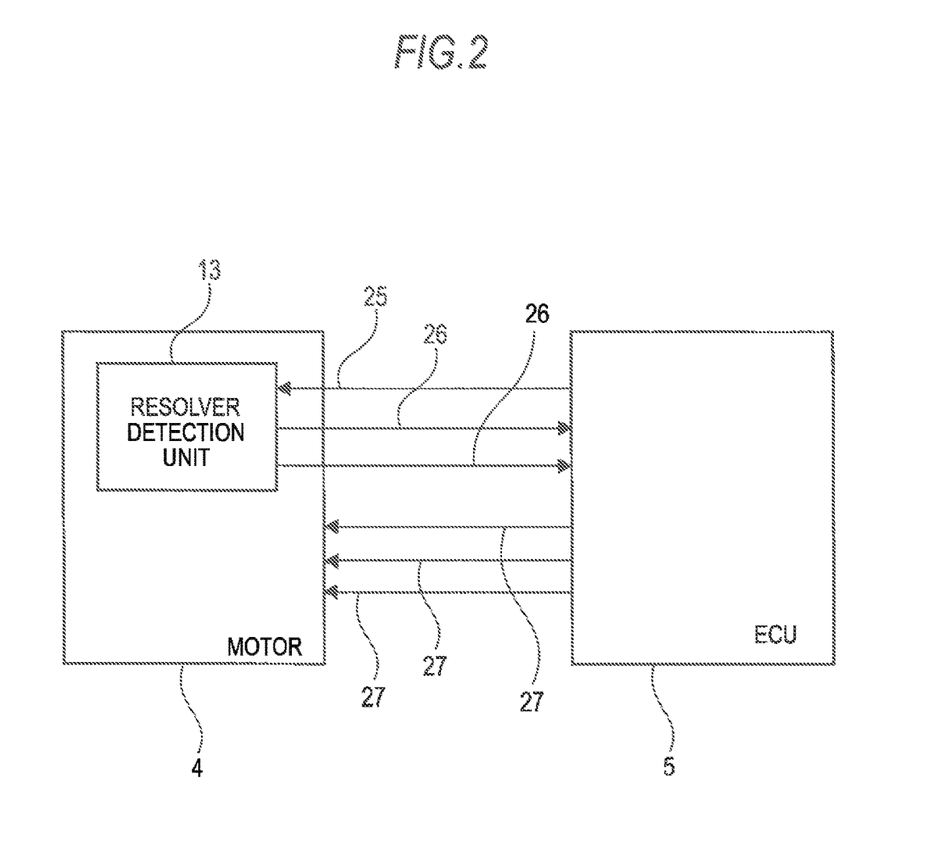
FIG. 2 is a block diagram showing a connection relation of a motor and an ECU of FIG. 1.
Figure 3:
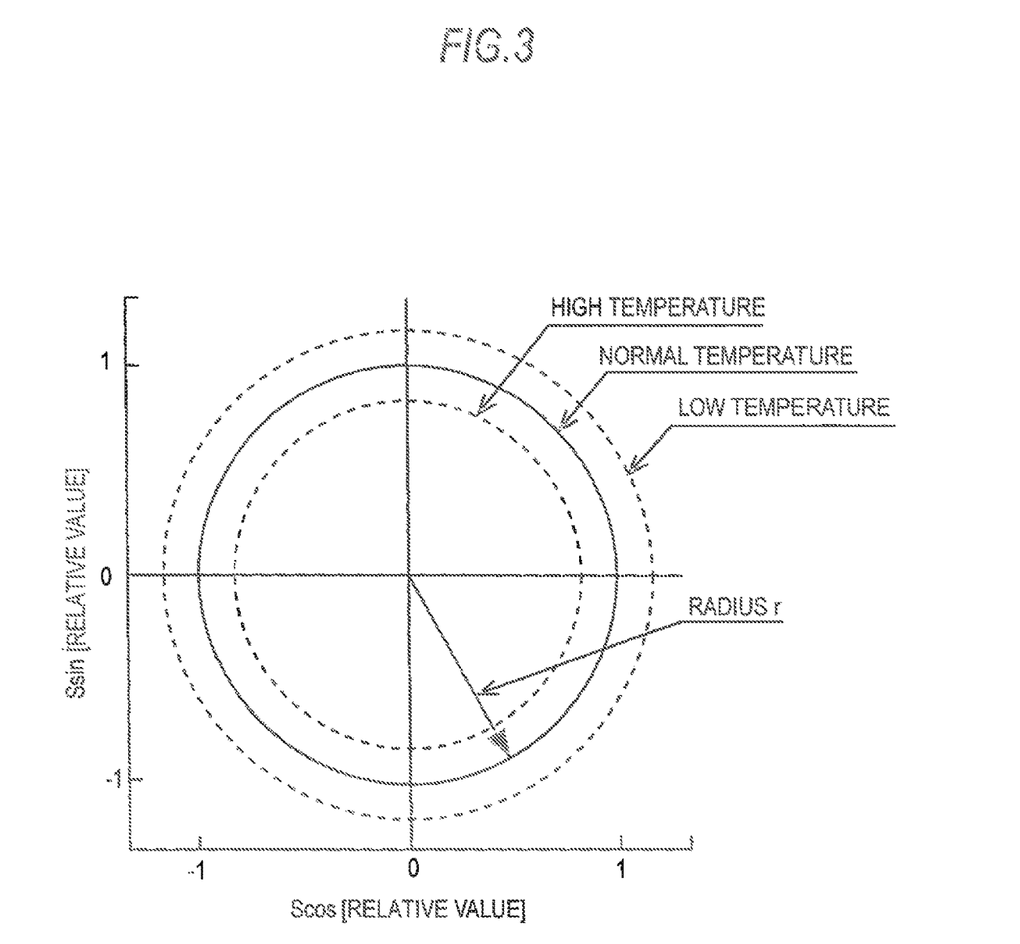
FIG. 3 is a view used to describe an output signal of a resolver detection unit in the form of a Lissajous curve according to the first embodiment of the invention.

FIG. 2 is a block diagram showing in detail a connection relation of the motor 4 and the ECU 5 shown in FIG. 1. The resolver detection unit 13 of FIG. 2 is formed of an unillustrated rotor rotating in synchronization with the motor 4, an unillustrated exciting stator having a one-phase exciting winding on which an exciting signal from the ECU 5 is applied, and an unillustrated stator for output signal having a two-phase output winding to output a motor rotation angle detection signal. Herein, the stator for output signal is disposed so that output signals are 90° apart in phase.

Also, referring to FIG. 2, the ECU 5 and the resolver detection unit 13 are connected to each other with an exciting signal line 25 to apply an exciting signal to the exciting winding of the resolver detection unit 13 using an unillustrated detection power supply connected to the ECU 5 and with two output signal lines 26 transmitting output signals to the ECU 5.

Also, three power lines 27 to supply a three-phase AC current using an unillustrated drive power supply connected to the ECU 5 are connected to the motor 4.

In addition to the detection power supply and the drive power supply mentioned above, unillustrated ECU and various sensors on the vehicle side are connected to the ECU 5.

An operation of the electric power steering control device configured as above will now be described.

Firstly, an exciting signal R, which is a sine wave, for example, of 10 (kHz) and 5 (Vpp), is applied to the exciting winding of the resolver detection unit from the detection power supply via the ECU 5.

The exciting signal R is expressed as Equation (1) as follows:

$$R = E \cdot \sin \omega t \quad (1)$$

where E is an exciting voltage, $\omega$ is an angular velocity, and t is a time.

An exciting current flows through the exciting winding by the exciting signal R and a magnetic flux is generated in an air gap portion between the exciting stator and the rotor for output signal of the resolver detection unit.

Herein, the rotor of the resolver detection unit rotates when the motor starts rotating. Then, the gap between the rotor and the stator for output signal varies and output signals S cos and S sin expressed as Equations (2) and (3) below, respectively, are outputted to the output winding.

$$S \cos = K \cdot E \cdot \sin \omega t \cdot \cos \theta \quad (2)$$

$$S \sin = K \cdot E \cdot \sin \omega t \cdot \sin \theta \quad (3)$$

where K is a ratio of transformation, E is an exciting voltage, $\omega$ is an angular velocity, t is a time, and $\theta$ is an electric angle.

The output signals S cos and S sin are outputted to the ECU 5. Because the output signals S cos and S sin are 90° apart in phase, the motor rotation angle can be detected.

The motor rotation angle detecting means 35 provided to the ECU 5 detects the motor rotation angle $\theta$ in accordance with Equation (4) as follows:

[Mathematical Formula 1]

$$\theta = \tan^{-1}(S \sin / S \cos) \quad (4).$$

Also, the motor temperature detector 32 changes values of the output signals S cos and S sin to relative values from −1 to 1 at the same time and creates a plot using the abscissa for the relative value of the output signal S cos and the ordinate for the relative value of the output signal S sin. Because the output signals S cos and S sin undergo simple harmonic motion with respect to each other, a Lissajous curve (hereinafter, defined as the Lissajous circle) shown in FIG. 3 can be obtained. The radius r of this Lissajous circle is expressed as Equation (5) as follows:

[Mathematical Formula 2]

$$r = \sqrt{(S\cos)^2 + (S\sin)^2} \quad (5).$$

Herein, impedance of each of the output winding and the exciting winding varies with temperatures. Hence, an output signal outputted from the output winding varies with a temperature T of the output winding (hereinafter, referred to as T). The radius r of the Lissajous circle therefore varies with the temperature T of the output winding.

Figure 4:
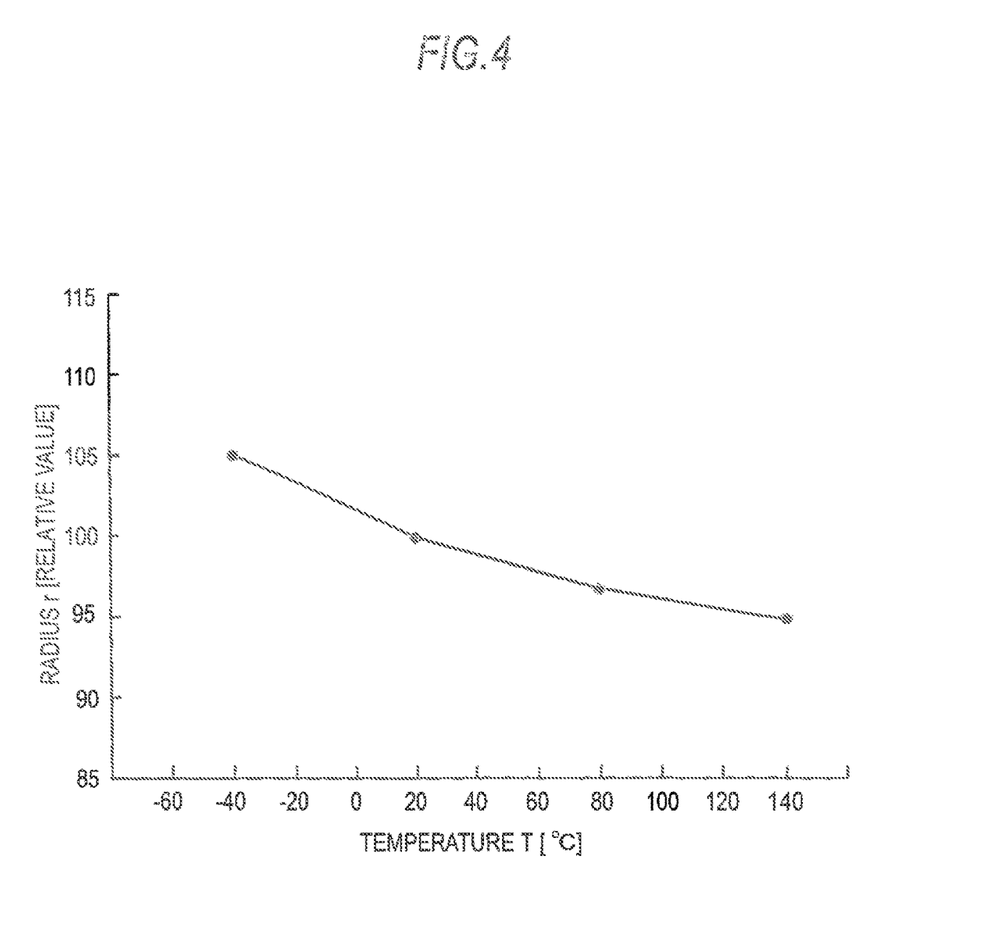
FIG. 4 is a view used to describe a relation of a radius of a Lissajous circle and a temperature of an output winding according to the first embodiment of the invention.

A relation of the temperature T of the output winding and the radius r of the Lissajous circle is shown in FIG. 4. The motor temperature detector 32 pre-stores the characteristics shown in FIG. 4 in the ECU 5 in the form of a temperature characteristic table.

The motor temperature detector 32 calculates the radius r of the Lissajous circle in accordance with Equation (5) above and detects the temperature T of the output winding by referring to the temperature characteristic table.

As has been described, by detecting the temperature T of the output winding having the temperature characteristics using the motor temperature detector 32, it becomes possible to make a temperature detection with a higher degree of accuracy from a low-temperature region to a high-temperature region as a temperature of the motor 4 including atmospheric temperature.

In the above description, the motor temperature detector 32 calculates the radius r of the Lissajous circle using one value of the output signals S cos and S sin. It should be appreciated, however, that by finding the radius r using more than one value of the output signals S cos and S sin sampled in a range of one cycle of electric angle, the radius r can be calculated more quickly with a further higher degree of accuracy.

The first embodiment has described the temperature detector using a Lissajous circle as an example. It should be appreciated, however, that the temperature detection method is not particularly limited to this example as long as the temperate detection method uses the temperature characteristics of the resolver detection unit and does not deviate from the scope of the invention.

The ambient temperature detector 33 for detecting ambient temperature will now be described.

In the first embodiment, the ambient temperature detector 33 detects ambient temperature T1 by attaching a part that directly detects a temperature like, for example, a thermistor, to the ECU 5.

The ECU 5 applies voltage transformation to a resistance value that varies with a temperature of the thermistor in the ECU and converts the resulting voltage value (hereinafter, referred to as V1) to a temperature, which is detected as the ambient temperature T1 (hereinafter, referred to as T1).

In the first embodiment, because the ECU 5 and the motor 4 are combined into one component, the motor temperature and ambient temperature substantially coincide with each other. Also, even in a case where there is a temperature difference between the temperatures T and T1 due to an attachment position of the ECU 5 and an attachment position of the thermistor, ambient temperature can be detected easily from the motor temperature by giving consideration to the result of a temperature difference of ambient temperature with respect to the motor temperature measured in advance.

Figure 5:
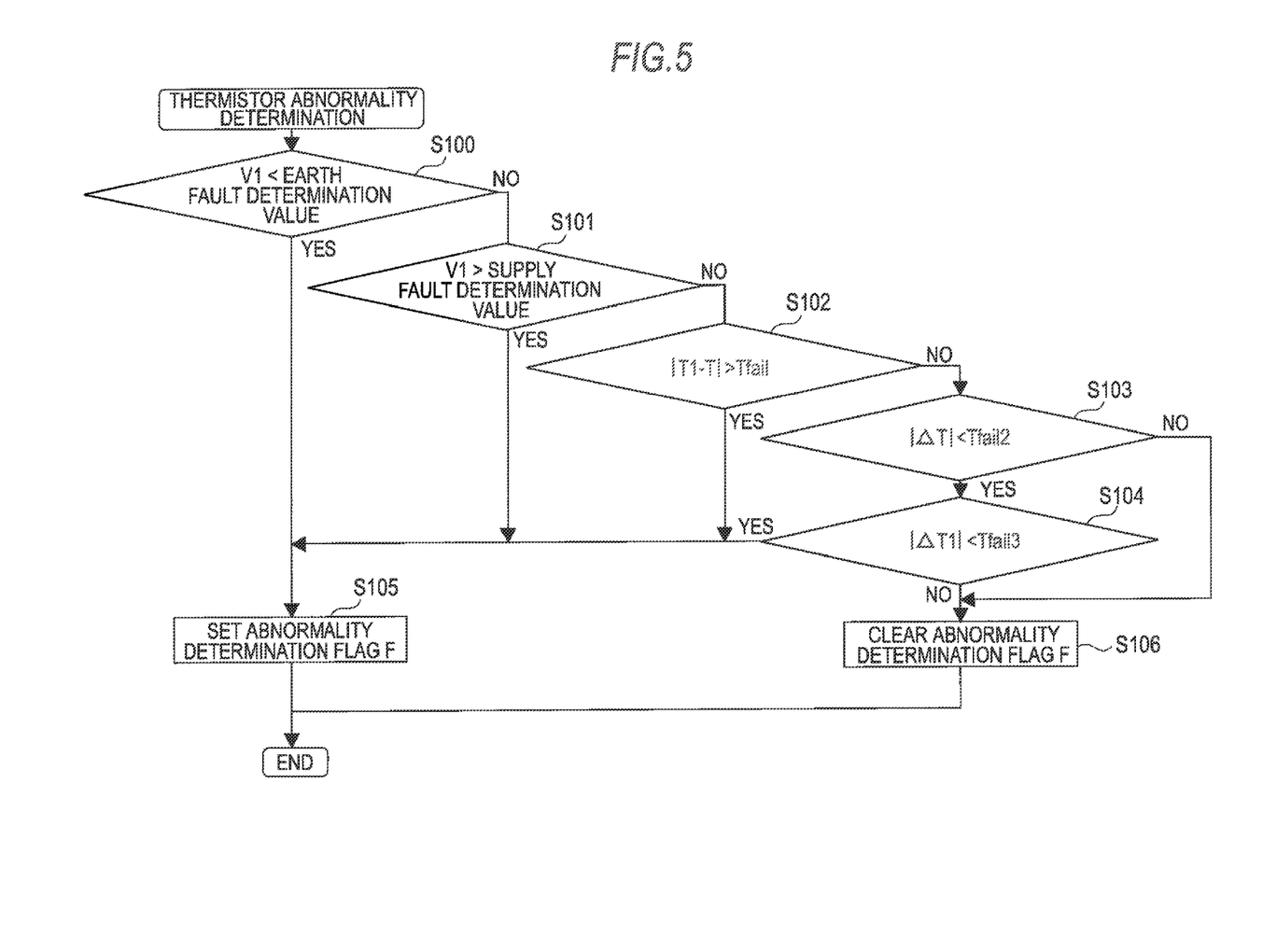
FIG. 5 is a flowchart of abnormality determiner according to the first embodiment of the invention.

The abnormality determiner 34 for making an abnormality determination on the ambient temperature detector 33 will now be described using FIG. 5. FIG. 5 is a flowchart depicting processing by the abnormality determiner 34 for making an abnormality determination on the ambient temperature detector 33.

Referring to FIG. 5, whether the thermistor serving as the ambient temperature detector 33 has an electric earth fault is determined on the basis of the voltage V1 in Step S100. When a determination of YES is made, advancement is made to Step S105.

In Step S105, an abnormality determination flag F is set because an abnormality determination is made.

When a determination of NO is made in Step S100, advancement is made to Step S101 in which whether the thermistor has an electric supply fault is determined. When a determination of YES is made, advancement is made to Step S105 and advancement is made to Step S102 when a determination of NO is made.

In other words, advancement is made to Step S102 when it is determined that an electrical connection state is not abnormal on the basis of V1 in Step S100 and Step S101 and a determination is made in Steps S102 through S104 for a region where an abnormality determination cannot be made on the basis of the voltage V1.

In Step S102, the temperatures T1 and T are compared and whether a difference is equal to or greater than a predetermined value Tfail is determined. When the difference is equal to or greater than Tfail, a determination of YES is made and advancement is made to Step S105 in which an abnormality determination result F is stored.

The predetermined value Tfail is set in consideration of a difference of detection values of T1 and T at the same ambient temperature.

In the temperature estimation method in the related art, atmospheric temperature of a portion generating heat cannot be reflected. Accordingly, in order to avoid a false abnormality determination, it is necessary to set Tfail relatively high, in other words, it is necessary to set a large margin. On the contrary, in the first embodiment, the temperatures T1 and T are both detection values on which atmospheric temperature is reflected. Hence, a margin allowed for atmospheric temperature is not necessary and Tfail can be set to a smaller value than the one in the related art.

More specifically, when an electrical connection state of the thermistor is normal, a difference between the temperatures T and T1 should be small. When a difference between T and T1 is large, it becomes possible to determine an abnormality caused by an output abnormality of the thermistor resulting from fixation or the like.

Owing to the configuration above, in the abnormality determiner 34 according to the first embodiment of the invention, atmospheric temperature is reflected on the temperature T of the output winding as with the ambient temperature T1, and detection can be made with a high degree of accuracy. Accordingly, a margin allowed for a false determination on the determination value can be smaller than in a case in the related using a motor current. Hence, it can be said that detection performance is excellent.

When a determination of NO is made in Step S102, advancement is made to Step S103 in which whether a variation of the detection temperature T, ΔT, during a predetermined period t0 is within a predetermined value Tfail2 is determined.

When a determination of YES is made, it is determined that a variation during the predetermined period t0 is small and advancement is made to Step S104.

In Step S104, whether a variation of the ambient temperature T1, ΔT1, during the predetermined period t0 is greater than a predetermined value Tfail3 is determined. When a determination of YES is made, advancement is made to Step S105 and the abnormality determination result F is set. When a determination of NO is made, it is determined that the thermistor serving as the ambient temperature detector 33 is normal and advancement is made to Step S106 in which the abnormality determination result F is cleared.

Herein, the predetermined period t0 is a value pre-set in the ECU, for example, for a period long enough for the portion generating heat undergoes a temperature change since the power supply of the ECU 5 is turned ON. Assume that ΔT and ΔT1 are measured at the same timing. It should be appreciated, however, that the measurement method of t0 is not particularly limited to the above method as long as the measurement timings and measurement periods of ΔT and ΔT1 are in synchronization with each other.

In addition, for example, lowest values of ΔT and ΔT1 that can vary during t0 are pre-set in the ECU 5 for Tfail2 and Tfail3, respectively.

More specifically, in a case where it is determined that the variation of T, ΔT, during the predetermined period t0 is small in Step S103 whereas the variation of T1, ΔT1, during the predetermined period t0 is greater than the predetermined value in Step S104, it can be determined that the detection results of T and T1 are obviously inconsistent.

Hence, even in a case where a different between T1 and T that cannot be determined in Step S102 is small, by determining that there is a difference between the values of the variations ΔT and ΔT1 during the certain period t0 in Step S103 and S104, respectively, it becomes possible to determine an output abnormality of the ambient temperature detector 33.

In the first embodiment described above, in a case where the predetermined value Tfail is so small a value that an abnormality determination can be made with a high degree of accuracy by the determination in Step S102 alone, Step S103 and Step S104 may be omitted. In a case where the necessity to make a determination in Step S102 is extremely low in practical terms, such as a case where there is no other choice but to set a relatively large value as Tfail, no problem occurs when determinations are made in Steps S103 and S104 alone by omitting Step S102.

A target current limitation method according to the abnormality determination result F in the target current setting means 2 according the first embodiment of the invention will now be described using FIG. 6.

Figure 6:
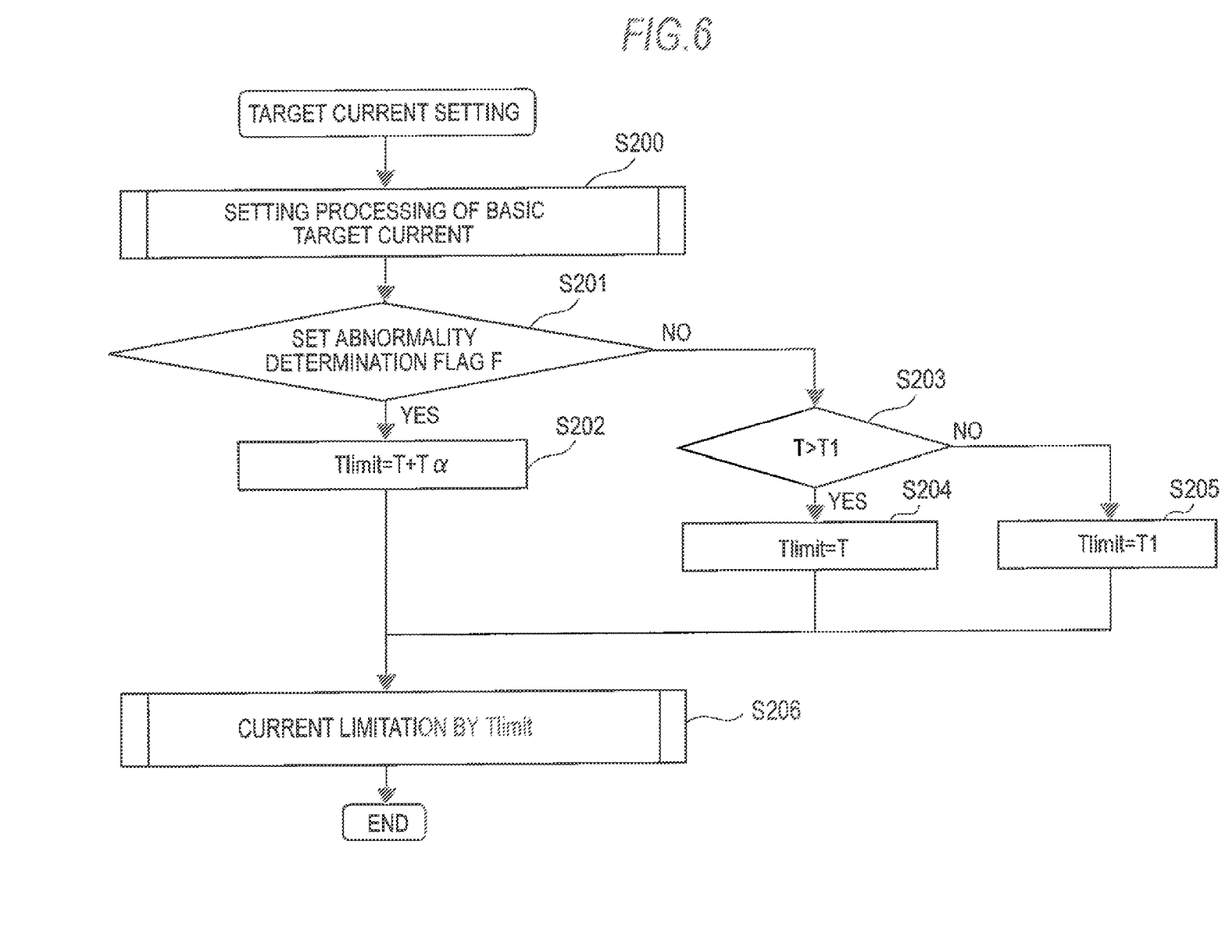
FIG. 6 is a flowchart depicting target current setting according to the first embodiment of the invention.

Referring to FIG. 6, in Step S200, the motor target current setting means 2 performs processing to set a target current that is the base determined on the basis of a detection torque from the steering torque detecting means 1 and outputs from the motor rotation angle detecting means 35 and the vehicle speed detecting means 3.

After the target current as the base is set, advancement is made to Step S201. Step S201 is a step in which a determination is made to select ambient temperature used in target current limitation processing described below.

In Step S201, whether the ambient temperature detector is abnormal or not, that is, whether the abnormality determination result F is set or not is determined first. Herein, advancement is made to Step S202 when it is determined that the abnormality determination result F is set.

In Step S202, ambient temperature Tlimit used in a case where the ambient temperature detector 33 is abnormal is determined for the target current limitation processing.

Herein, Tlimit is ambient temperature used to limit the motor current to protect the motor 4 and the ECU 5 from overheating in Step S206. As Tlimit becomes higher, the motor current is controlled more in a direction to be limited and is therefore thermally protected.

In the first embodiment, it is assumed that a value of the ambient temperature T1 detected when the ambient temperature detector 33 is normal is higher than a value of the motor temperature T. Hence, when the value of T1 is abnormal, the motor temperature T becomes lower than the actual temperature and Tα comparable to a difference from the actual value is added. The purpose of this addition is to prevent the motor temperature T from dropping to a temperature lower than the actual temperature because, as described above, in a case where the current is limited, the motor current is controlled in Step S206 in a thermally safer direction as the ambient temperature becomes higher.

In a case where the ambient temperature T1 when the ambient temperature detector 33 is normal and the motor temperature T coincide with each other or the motor temperature T is the higher, the motor current is controlled in a safe direction without adding Tα and addition is not particularly necessary in this case. A temperature correlation of T1 and T can be empirically obtained in advance. Hence, the necessity of setting Tα can be determined from the correlation.

When it is found in Step S201 that the abnormality determination result F is cleared, it is determined that the ambient temperature detector 33 is normal, and advancement is made to Step S203. In Step S203, the motor temperature T and the ambient temperature T1 are compared. When it is determined that T has the higher temperature, advancement is made to Step S204 in which the motor temperature T is set to Tlimit. Then, advancement is made to Step S206.

When it is determined in Step S203 that T1 is the higher, advancement is made to Step S205 in which the ambient temperature T1 is set to Tlimit. Then, advancement is made to Step S206.

In other words, by comparing T and T1 and selecting the higher temperature in Steps S203 through S205, Tlimit is set in a safer direction.

In a case where the ambient temperature T1 and the motor temperature T coincide with each other or it is empirically obvious that T1 is the lower in any circumstance, Steps S203 and S204 can be omitted. In a case where it is determined that the ambient temperature detector 33 is normal, no problem occurs by setting: Tlimit=T1.

As has been described, Tlimit is set by way of the processing from Steps S201 through S205. Then, in Step S206, the motor current is controlled by using Tlimit set to an optimal value either in a normal state or an abnormal state so that overheating of the motor and the controller caused by an overload of the motor can be prevented according to an input from the motor current detecting means 37.

As has been described, the electric power steering control device according to the first embodiment of the invention is a vehicle electric power steering control device equipped with a motor generating an assist force for a truing operation on a steering wheel by a current flown correspondingly to an operating condition of the vehicle and having a resolver detection unit. The electric power steering control device includes: ambient temperature detector for detecting ambient temperature around a portion generating heat by the current; motor temperature detector having temperature characteristics and for estimating a temperature of the portion generating heat on the basis of a signal of the resolver detection unit of the motor; and abnormality determiner for determining that the ambient temperature detector is abnormal by comparing a detection temperature by the ambient temperature detector with a temperature detected by the motor temperature detector. The electric power steering control device has characteristics and obtains functions and effects as follows.

(1) A signal from the resolver detection unit has temperature characteristics by its nature. That is to say, the signal has a correlation with not only heat generation by a motor current but also a motor temperature itself on which ambient temperature is reflected.

When the motor and the ECU are next to each other or the motor and the ECU are combined into one component, it can be said that ambient temperature around the motor and the ECU, which are the portion generating heat, is substantially as high as the motor temperature. Also, even when there is a temperature difference to some extent, it is easy to empirically take a temperature difference between the motor and the portion generating heat into consideration.

Hence, with the electric power steering control device according to the first embodiment of the invention, ambient temperature can be detected with a high degree of accuracy by the motor temperature detector using a signal of the resolver detection unit. Hence, in a case where the ambient temperature detector for the portion generating heat is abnormal, by comparing a detection temperature of the ambient temperature detector with a detection temperature detected by the temperature detector on the basis of a signal of the resolver detection unit and reflecting atmospheric temperature, a margin allowed to avoid a false determination on an abnormality determination value of the ambient temperature detector can be reduced to a minimum. It thus becomes possible to make an abnormality determination on the ambient temperature detector with a high degree of accuracy.

(2) Also, the temperature estimation method in the related art using an integrated value obtained by adding up a value corresponding to a current value of the electric motor with an elapse of time requires a time for a temperature change to occur, that is to say, some measure of time accompanying a temperature rise is necessary in order to estimate a temperature.

On the contrary, a signal of the resolver detection unit of the first embodiment is a signal in synchronization with the number of motor rotations. Hence, by merely operating the motor, it becomes possible to detect a temperature in a very short time hardly accompanying a temperature rise.

A temperature can be therefore detected more quickly than by the method in the related art, which makes it possible to determine an abnormality of the ambient temperature detector quickly as well. Consequently, even when the ambient temperature detector is already abnormal, a time taken for an abnormality determination can be shorter. It thus becomes possible to limit a current quickly so as to lessen damage on the portion generating heat by a motor current.

(3) In addition, because the motor temperature detector using a signal of the resolver detection unit has temperature characteristics and can detect a temperature quickly, a temperature can be detected in a low-temperature region. Hence, it becomes possible to detect a motor temperature and make an abnormality determination on the ambient temperature detector even in a low-temperature region in which the method in the related art is not feasible.

(4) Further, the temperature is detected on the basis of a signal from the resolver detection unit, which is provided in the related art mainly with the aim of detecting a motor rotation angle. Hence, without the need to additionally provide one more thermistor for an abnormality determination on the ambient temperature detector and hence without a cost increase, it becomes possible to obtain advantages equivalent to those in a case where a thermistor is provided additionally.

INDUSTRIAL APPLICABILITY

The invention is applicable to a vehicle electric power steering device equipped with an electric motor that provides an assist force for a turning operation on the steering wheel.

The invention claimed is:

1. An electric power steering control device for a vehicle that is equipped with a motor generating an assist force for a truing operation on a steering wheel by a current flown correspondingly to an operating condition of the vehicle and having a resolver detector, the electric power steering control device including:
　　an ambient temperature detector configured to detect, via a thermistor, an ambient temperature at a portion generating heat which generates heat due to the current;
　　a motor temperature detector configured to estimate a temperature of the portion generating heat based on a signal of the resolver detector having temperature characteristics; and
　　an abnormality determiner configured to determine whether the ambient temperature detector is abnormal by comparing a detected ambient temperature, which is detected by the ambient temperature detector, with an estimated temperature, which is estimated by the motor temperature detector,
　　wherein the abnormality determiner is configured to determine that the ambient temperature detector is abnormal in response to determining that an absolute value of a difference between the detected ambient temperature and the estimated temperature is greater than or equal to a threshold value,
　　wherein, when the absolute value of the difference between the detected ambient temperature and the estimated temperature is less than the threshold value, the abnormality determiner is configured to determine that the ambient temperature detector is abnormal in response to the estimated temperature not being varied by a predetermined temperature or more and the detected ambient temperature being varied by a predetermined temperature or more, and
　　wherein the motor temperature detector is configured to estimate the temperature of the portion generating heat by calculating a Lissajous circle based on the signal of the resolver detector and referring to the temperature characteristics of the motor that have been pre-stored.

2. The electric power steering control device according to claim 1, wherein:
　　the abnormality determiner is configured to determine that the ambient temperature detector is abnormal based on temperature variations per a predetermined time of the detected ambient temperature and the estimated temperature.

3. The electric power steering control device according to claim 1, wherein:
　　when the abnormality determiner determines that the ambient temperature detector is abnormal, the current of the motor is limited according to the estimated temperature.

4. The electric power steering control device according to claim 1, wherein:
　　when the abnormality determiner determines that the ambient temperature detector is not abnormal, the current of the motor is limited according to one of the detected temperature and the estimated temperature whichever has a higher temperature.

5. The electric power steering control device according to claim 1, wherein the motor temperature detector is configured to compute the temperature characteristics related to the motor, and
　　the computed temperature characteristics related to the motor are pre-stored in a table.

6. An electric power steering control device for a vehicle that is equipped with a motor generating an assist force for a truing operation on a steering wheel by a current flown correspondingly to an operating condition of the vehicle and having a resolver detector, the electric power steering control device including:
　　an ambient temperature detector configured to detect, via a thermistor, an ambient temperature at a portion generating heat which generates heat due to the current;
　　a motor temperature detector configured to estimate a temperature of the portion generating heat based on a signal of the resolver detector having temperature characteristics; and
　　an abnormality determiner configured to determine whether the ambient temperature detector is abnormal by comparing a detected ambient temperature, which is detected by the ambient temperature detector, with an estimated temperature, which is estimated by the motor temperature detector,
　　wherein the abnormality determiner is configured to determine that the ambient temperature detector is abnormal in response to determining that an absolute value of a difference between the detected ambient temperature and the estimated temperature is greater than or equal to a threshold value,
　　wherein, when the absolute value of the difference between the detected ambient temperature and the estimated temperature is less than the threshold value, the abnormality determiner is configured to determine that the ambient temperature detector is abnormal in response to the estimated temperature not being varied by a predetermined temperature or more and the detected ambient temperature being varied by a predetermined temperature or more,
　　wherein the motor temperature detector is configured to compute the temperature characteristics related to the motor,
　　wherein the computed temperature characteristics related to the motor are pre-stored in a table which defines a relationship between various radiuses of the Lissajous circle and corresponding temperatures of the portion generating heat, and
　　wherein the motor temperature detector is configured to calculate an actual radius of the Lissajous circle based on an actual rotation angle detected by the resolver detector, and estimate the temperature of the portion generating heat by matching the calculated actual radius to a corresponding temperature pre-stored in the table.

7. The electric power steering control device according to claim 6, wherein:
　　the abnormality determiner is configured to determine that the ambient temperature detector is abnormal based on temperature variations per a predetermined time of the detected ambient temperature and the estimated temperature.

8. The electric power steering control device according to claim 6, wherein:
　　when the abnormality determiner determines that the ambient temperature detector is abnormal, the current of the motor is limited according to the estimated temperature.

9. The electric power steering control device according to claim 6, wherein:
　　when the abnormality determiner determines that the ambient temperature detector is not abnormal, the current of the motor is limited according to one of the detected temperature and the estimated temperature whichever has a higher temperature.

* * * * *